A. P. SMITH.
ROTARY PUMP.
APPLICATION FILED OCT. 20, 1910.

1,000,305.

Patented Aug. 8, 1911.
3 SHEETS—SHEET 1.

WITNESSES

INVENTOR
Albert P. Smith
BY
ATTORNEYS

A. P. SMITH.
ROTARY PUMP.
APPLICATION FILED OCT. 20, 1910.

1,000,305.

Patented Aug. 8, 1911.
3 SHEETS—SHEET 2.

WITNESSES

INVENTOR
Albert P. Smith
BY
ATTORNEYS

UNITED STATES PATENT OFFICE.

ALBERT P. SMITH, OF WINNEMUCCA, NEVADA.

ROTARY PUMP.

1,000,305. Specification of Letters Patent. Patented Aug. 8, 1911.

Application filed October 20, 1910. Serial No. 588,068.

*To all whom it may concern:*

Be it known that I, ALBERT P. SMITH, a citizen of the United States, and a resident of Winnemucca, in the county of Humboldt and State of Nevada, have invented a new and Improved Rotary Pump, of which the following is a full, clear, and exact description.

Among the principal objects which the present invention has in view are: to provide a pump wherein the lifting power is supplied by weighted members which may be varied to harmonize with the conditions under which the pump is working; to provide a mechanism wherein the lift of the water on the intake side of the pump is produced by the fall of the weighted members above referred to; to provide a mechanism the operation whereof is balanced to coöperate in the function of the pump; and to provide a mechanism simple, efficient and durable.

One embodiment of the present invention is disclosed in the structure illustrated in the accompanying drawings, in which like characters of reference denote corresponding parts in all the views, and in which—

Figure 1:
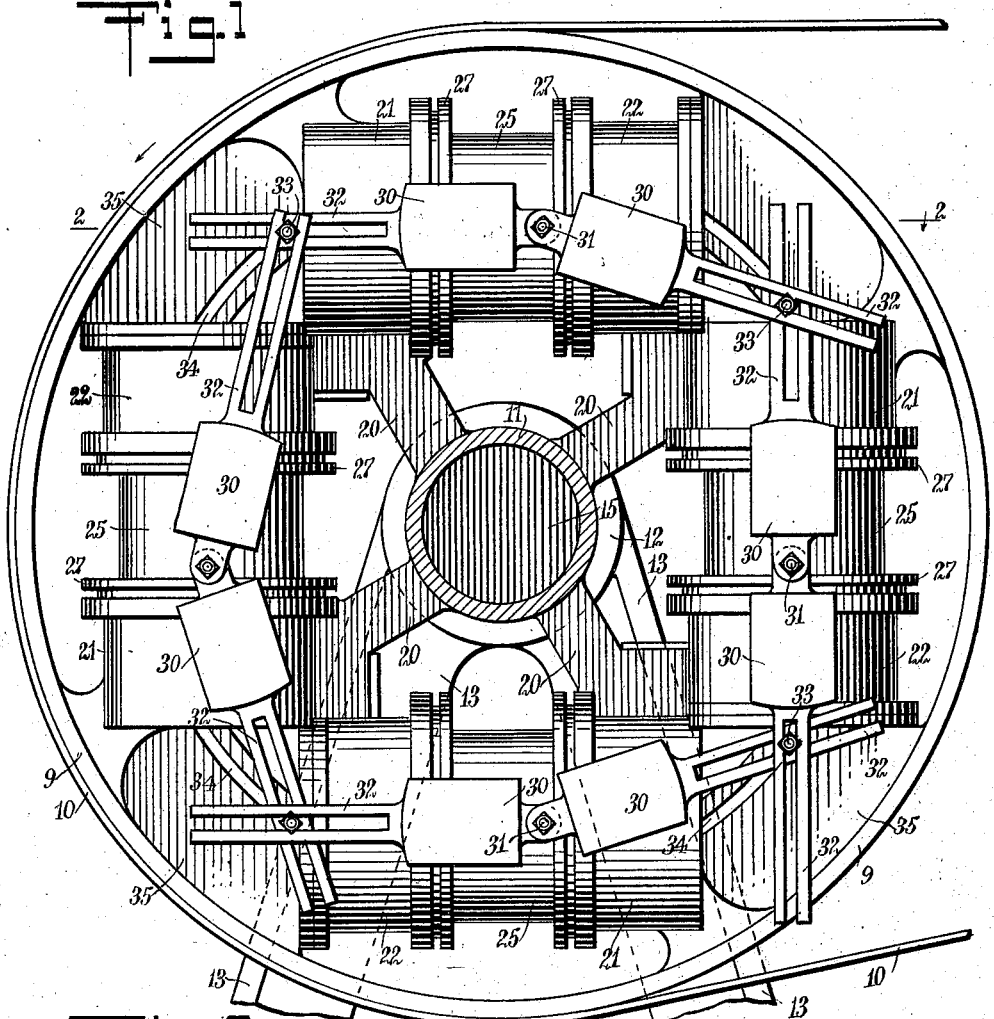
Figure 2:
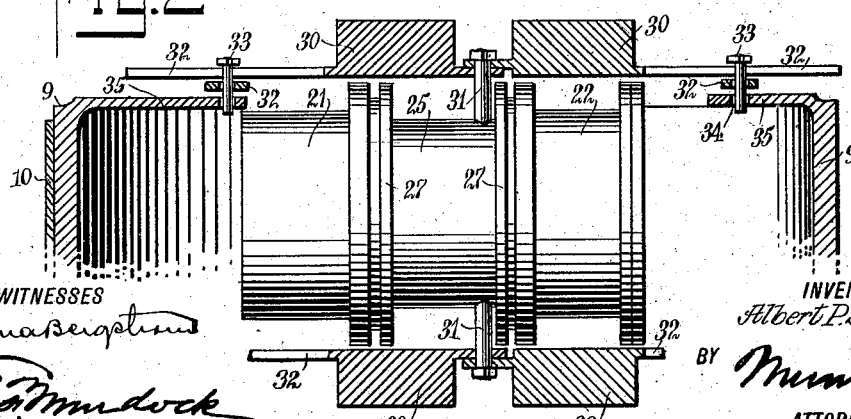
Figure 3:
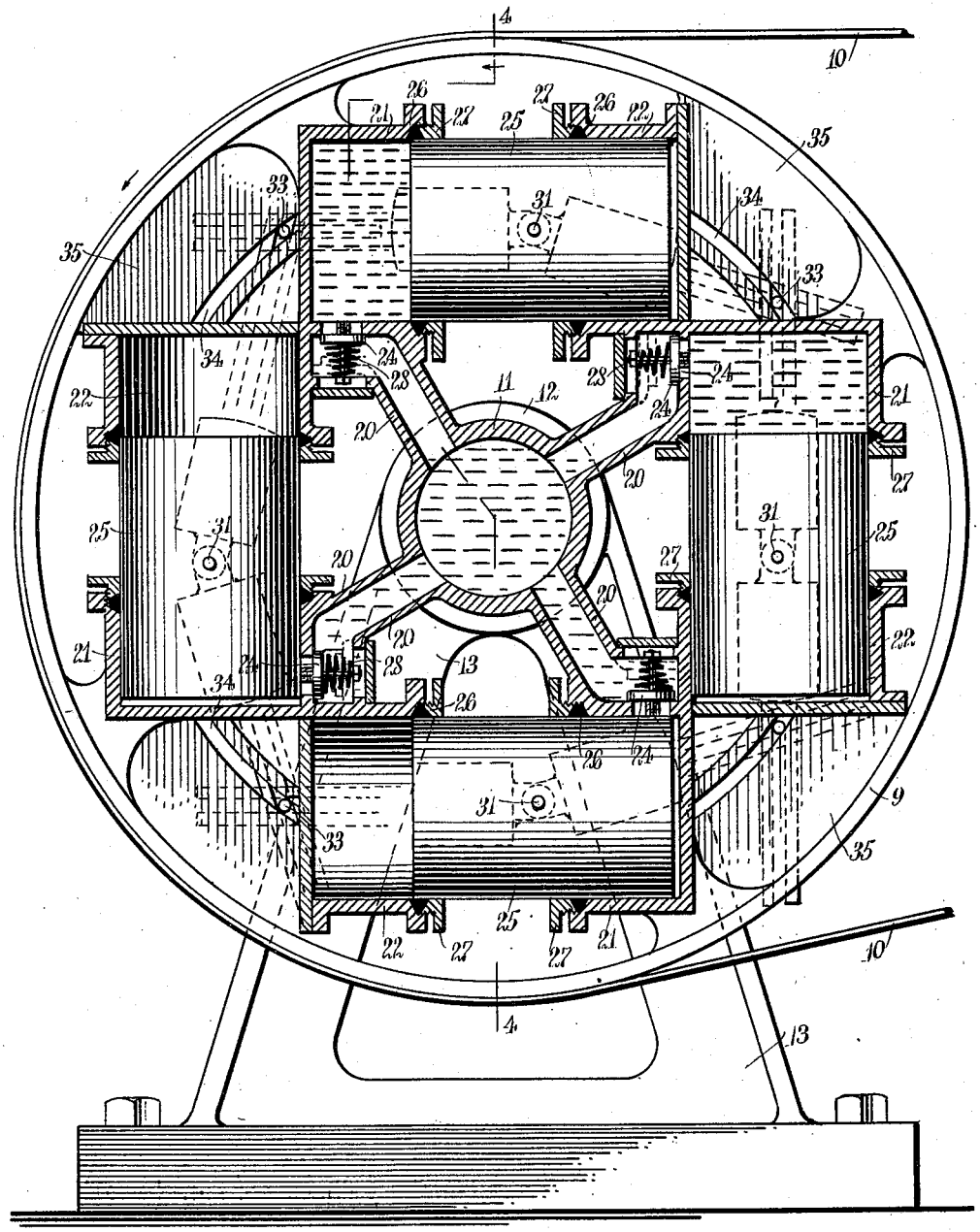
Figure 4:
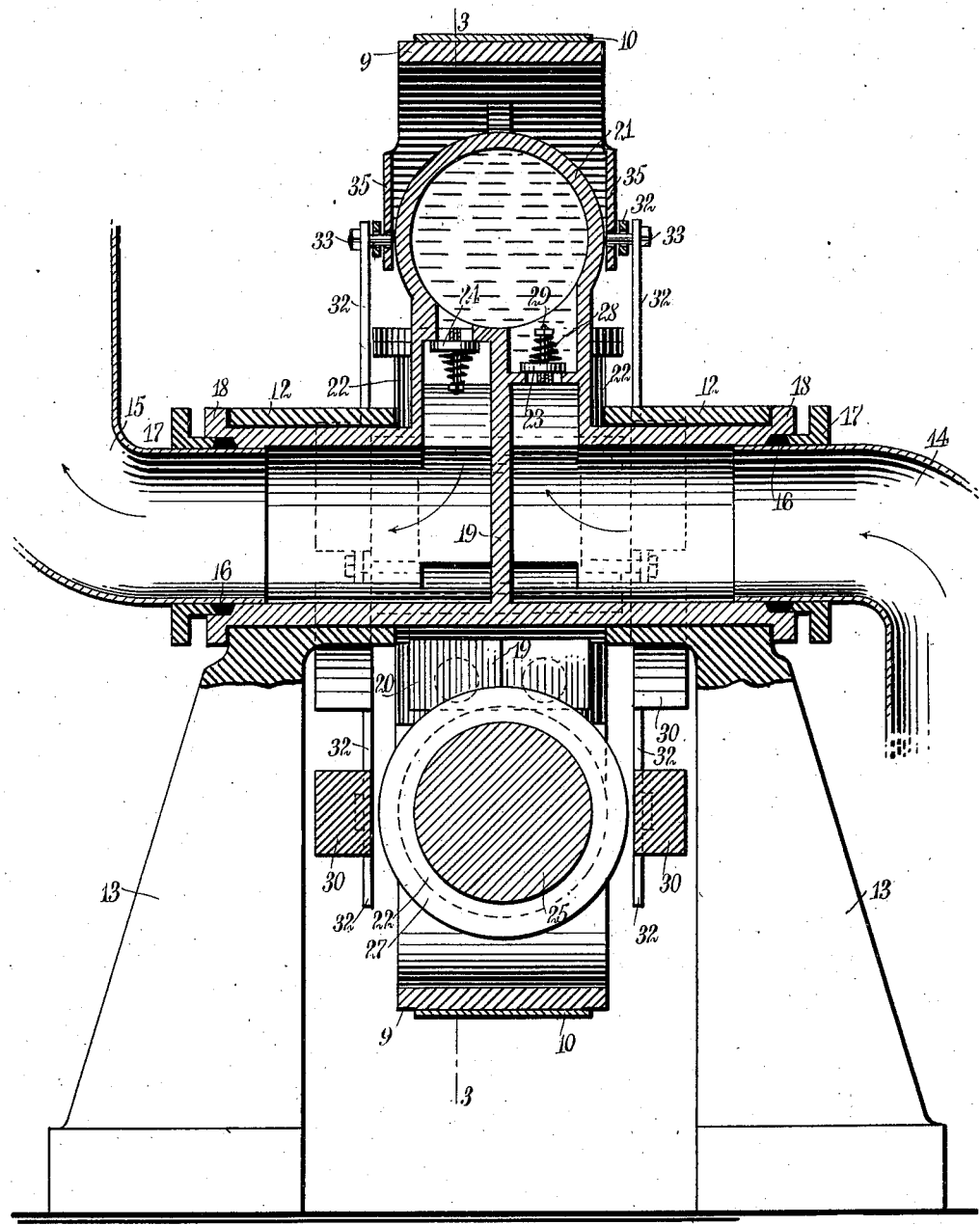

Figure 1 is a side view of a pump constructed and arranged in accordance with the present invention, the bearing hub being shown in section; Fig. 2 is a horizontal section taken on the line 2—2 in Fig. 1; Fig. 3 is a vertical longitudinal section taken on the line 3—3 in Fig. 4; and Fig. 4 is a vertical cross section taken on the line 4—4 in Fig. 3.

The pump illustrated in the accompanying drawings is mounted in a wheel-like frame, the periphery or felly 9 whereof is faced to receive a driving belt 10, which is driven from any suitable source of power, not shown in the drawings. The felly 9 is supported by the interior framing structure which is connected with a hollow bearing shaft 11. The shaft 11 is mounted in suitable bearings 12, 12 formed in the head of standards 13, 13 provided to support the pump in rotary position in said standards. The shaft 11 is connected with an intake pipe 14 on the one end of the said shaft, and a delivery pipe 15 connected with the opposite end of the said shaft. The joint between the shaft 11 and the said pipes 14 and 15 is a rotary joint, leakage therefrom being prevented by soft packing 16, 16 which is compressed against the pipes 14 and 15 by means of glands 17, 17. Suitable bolts are provided for the said glands, but not shown in the accompanying drawings, for drawing the said glands upon the flanges 18, 18 formed at the ends of the shaft 11.

The pipe 14 is connected with the water reservoir or supply. The pipe 15 is carried to the point of delivery. The interior of the pump is divided on the median line by a solid partition 19. The partition 19 is extended through arms 20, 20, and forms a part of the support for the cylinders 21, 21 and 22, 22. The cylinders 21 constitute the pump cylinders and are provided with intake valves 23 on one side of the partition 19 and with delivery valves 24 on the opposite side of the said partition.

As many cylinders 21, 22 as desired may be used, the number being regulated by the size of the said cylinders and the diameter of the felly 9. The cylinders 21, 22 are also guide cylinders for the operation of the pistons 25, 25. The openings of the cylinders 22, 22 are sealed by soft packings 26, 26 and glands 27, 27. In the operation of the pump each of the cylinders performs the same function, and the operation of one will be understood to be the operation of each and all.

The operation of the valves whereby the water or other liquid is introduced into and ejected from the cylinders 21 is substantially as follows: When the cylinder 21 is disposed above the piston 25, the piston 25 drops into the cylinder 22 and away from the head of the cylinder 21, causing in the said cylinder 21 a partial vacuum. To supply the vacuum water is drawn from the arm 20, the shaft 11 and pipe 14, the valve 23 lifting inwardly to admit the water to the cylinder 21. When the cylinder 21 is filled the valve 23 is closed by the operation of a spring 28 with which the said valve is provided. The spring 28 surrounds the valve stem 29, as in usual pump valve construction. The position of the piston 25 and the cylinders 21 and 22, when the pump is in this position, is illustrated in Fig. 3, at the right hand side of said figure. In this figure the valve 23 is not shown, the section being taken on the delivery side of the partition 19. When now the pump is rotating as illustrated by the arrow in Fig. 3, the said cylinders and pistons are disposed at the top of the rotary path, the valves 23 and 24 remaining closed. When the felly 9 is further rotated until the cylinder is in the position shown at the left hand side of Fig. 3, the weighted piston 25 added to the weight of the water contained in the cylinder 21, forces the water contained in the said cylinder outward through the valve 24 into the pipe 15, by way of the arm 20 to which the said cylinder is connected, on the delivery side of the partition 19.

Each of the pistons operates as above described, dropping by their weight on the upmoving side of the felly 9, and opening the intake valve to receive a charge of the liquid being pumped, and dropping against the contained liquid on the down moving side of the felly 9 to eject the said liquid from the said cylinder. The lift of the water in the pipe 15 regulates the weight necessary to carry the pistons 25 to eject the liquid, as above set forth.

To each of the pistons 25 is pivotally connected weights 30, 30. The weights 30, 30 are pivotally connected to bolts 31, 31 set out from the side of the pistons 25. The weights 30, 30 are provided with bifurcated extension arms 32, 32. The arms 32, 32 straddle the bolts 33, 33 to form guides for the control of the said weights, and to provide for a certain amount of play of the said weights while preventing any threshing of the same. The bolts 33 are disposed in slots 34 formed in web plates 35, 35. The bolts 33 may be shifted in the slots 34 to govern the path of the movement of the arms 32, 32. As above stated, the weights 30, 30 may be varied, the said weights and parts connected therewith being removable and adjusted to the work required of the engine.

The operation of the pump when constructed as above described and as shown in the accompanying drawings, is as follows: As stated, the belt 10 is driven by any suitable motor. The speed of the belt is preferably slow. The rotation of the pump in the direction shown by the arrows in Figs. 1 and 3, produces an action on each cylinder, disposing the parts therein in the relation shown in Fig. 3 of the drawings. That is to say, each cylinder during the period of one complete revolution of the felly 9 assumes substantially the various positions shown in the said Fig. 3. In their correlation it will be observed that when the cylinder at the right hand side of said Fig. 3 is taking a charge, the cylinder at the left hand side of the said figure is delivering its charge. The two cylinders in the horizontal position, the one at the top of the figure and the other at the bottom of the figure, are as disposed by the action of the piston 25 in each, in the two positions at the right and left of the said figure of drawings, or on the upward and downward movement of the felly 9.

The result of the operation of the successive cylinders is to take the water from the pipe 14, passing the same through the various cylinders 21, and to deliver the same out through the pipe 15.

While I have herein described the operation as effected by the one set of cylinders 21 as employed as power cylinders, it will be understood the same operations are performed by the set of cylinders 22. The two sets of cylinders operate in alternate relation; that is to say, when the one cylinder 21 is discharging the water, the cylinder 22, in which the same piston 25 is mounted, is receiving water.

Having thus described my invention, what I claim as new and desire to secure by Letters Patent is:—

1. A rotary pump, comprising a rotary frame; a plurality of pump cylinders mounted on said frame, each of said cylinders having intake and exhaust valves; a plurality of supply pipes communicating with said cylinders when said intake valves are open; a plurality of delivery pipes in communication with said cylinders when said exhaust valves are open; a piston mounted in each of said cylinders and adapted to be reciprocated therein by gravity; means for guiding the said pistons in their reciprocation; a plurality of weighted members pivotally mounted on said pistons and provided with guide extensions; and a plurality of guiding members for said extensions adapted to move the said weighted members out of straight line adjustment.

2. A rotary pump comprising a wheel-like frame, the felly whereof is adapted to receive a driven belt; a hollow bearing shaft for said frame; hollow spokes in open communication with said shaft; a plurality of pump cylinders rigidly mounted in said frame in open communication with said hollow spokes; and a plurality of weighted pistons loosely mounted in said cylinders to be reciprocated therein by the weight carried by said pistons.

3. A rotary pump comprising a wheel-like frame having a felly adapted to receive a driven belt; a hollow shaft for said frame; hollow spokes in open communication with the interior of said shaft and having a plurality of open-ended pump cylinders interposed between the said spokes and said felly, and in valve controlled communication with said spokes, said felly, shaft, spokes, and cylinders being formed integral; and a plurality of weighted pistons loosely mounted in said cylinders to be operated therein by the weight of said cylinders.

4. A rotary pump comprising an integral wheel-like frame, said frame having a felly adapted to receive a driven belt; a hollow shaft having a dividing partition disposed between the ends thereof; a plurality of hollow spokes in open communication with said shaft, said spokes being each provided with a dividing partition; a plurality of open ended pump cylinders communicating with said spokes and with each side of the partition therein; a plurality of weighted pistons slidably mounted in said cylinders; and valves for controlling the intake and exhaust of said cylinders, said valves operating in opposite directions on both sides of said partitions in said spokes.

In testimony whereof I have signed this specification in the presence of two subscribing witnesses.

ALBERT P. SMITH.

Witnesses:
HARRY M. LEWERS,
JAMES S. ABEL.

Copies of this patent may be obtained for five cents each, by addressing the "Commissioner of Patents, Washington, D. C."